US008358320B2

United States Patent
Zhou et al.

(10) Patent No.: US 8,358,320 B2
(45) Date of Patent: Jan. 22, 2013

(54) INTERACTIVE TRANSCRIPTION SYSTEM AND METHOD

(75) Inventors: Steven ZhiYing Zhou, Singapore (SG); Syed Omer Gilani, Singapore (SG)

(73) Assignee: National University of Singapore, Singapore (SG)

( * ) Notice: Subject to any disclaimer, the term of this patent is extended or adjusted under 35 U.S.C. 154(b) by 583 days.

(21) Appl. No.: 12/263,857

(22) Filed: Nov. 3, 2008

(65) Prior Publication Data

US 2009/0195656 A1   Aug. 6, 2009

Related U.S. Application Data

(60) Provisional application No. 61/001,764, filed on Nov. 2, 2007.

(51) Int. Cl.
*G09G 5/00* (2006.01)
(52) U.S. Cl. .......................... 345/632; 345/633
(58) Field of Classification Search .............. 345/619, 345/629, 632, 633, 173, 179, 156; 715/863, 715/864, 268; 725/37
See application file for complete search history.

(56) References Cited

U.S. PATENT DOCUMENTS

| | | | |
|---|---|---|---|
| 5,629,714 A * | 5/1997 | Nishitani et al. ............ 345/2.3 |
| 5,730,602 A | 3/1998 | Gierhart et al. | |
| 6,215,901 B1 | 4/2001 | Schwartz | |
| 2003/0062675 A1 | 4/2003 | Noro et al. | |
| 2003/0063115 A1 | 4/2003 | Kaku et al. | |
| 2004/0003350 A1* | 1/2004 | Simmons et al. ............ 715/517 |
| 2005/0264555 A1 | 12/2005 | Zhou et al. | |
| 2005/0276444 A1 | 12/2005 | Zhou et al. | |
| 2005/0288078 A1 | 12/2005 | Cheok et al. | |
| 2008/0229192 A1* | 9/2008 | Gear et al. ............ 715/268 |
| 2009/0077122 A1* | 3/2009 | Fume et al. ............ 707/103 R |
| 2009/0102859 A1* | 4/2009 | Athsani et al. ............ 345/619 |
| 2009/0271821 A1* | 10/2009 | Zalewski ............ 725/37 |
| 2011/0109595 A1* | 5/2011 | Cohen et al. ............ 345/179 |
| 2011/0128238 A1* | 6/2011 | Han et al. ............ 345/173 |

OTHER PUBLICATIONS

Zhou et al., "What You See Is What You Get: A Novel Mixed Reality Interface", Proc. HCI International, Beijing, Jul. 22-27, 2007.*
"Computer Vision Publications",http://stefan.winkler.net/pub-cv.html, Feb. 2011.*
D.Y. Chen et al., "On Visual Similarity Based 3D Model Retrieval", Eurographics 2003, vol. 22, No. 3, 2003, The Eurographics Association and Blackwell Publishers 2003, 10 pages.
Y. Itoh et al., "Tsu.Mi.Ki: Stimulating Children's Creativity and Imagination with Interactive Blocks" Proceedings of the Second International Conference on Creating, Connecting and Collaborating through Computing (C5'04), 2004, IEEE Computer Society, 8 pages.
K.R. Liu et al, "New Media Learning for Children-Interact with Color and Tempo", Proceedings of the IEEE International Conference on Sensor Networks, Ubiquitous, and Trustworthy Computing (SUTC'06), 2006 IEEE Computer Society, 6 pages.
N. Otsu, "A Threshold Selection Method from Gray-Level Histograms", IEEE Transactions on Systems, Man and Cybernetics, vol. SMC-9, No. 1, Jan. 1979, IEEE, pp. 62-66.
O. Portillo et al., "Haptic Desktop, for Assisted Handwriting and Drawing", 2005 IEEE International Workshop on Robots and Human Interactive Communication, 2005 IEEE, pp. 512-517.

(Continued)

*Primary Examiner* — Chante Harrison
(74) *Attorney, Agent, or Firm* — Ostrolenk Faber LLP

(57) ABSTRACT

A method and system which seamlessly combines natural way of handwriting (real world) with interactive digital media and technologies (virtual world) for providing a mixed or augmented reality perception to the user is disclosed.

27 Claims, 7 Drawing Sheets

OTHER PUBLICATIONS

M. Resnick, "Technologies for Lifelong Kindergarten", Educational Technology Research and Development, vol. 46, No. 4, 1998, 18 pages.

E. Wartella et al., "Children and Interactive Media", Markle Foundation Report, May 2000, 195 pages.

Z. Zhou et al., "Magic Cubes for Social and Physical Family Entertainment", Interactivity, CHI 2005, Apr. 2-7, 2005, Portland, Oregon, USA, pp. 1156-1157.

Z. Zhou et al., "Multisensory Musical Entertainment Systems", IEEE Multimedia, IEEE Computer Society, Jul.-Sep. 2004, pp. 88-101.

* cited by examiner

COMPARISON CHART

| | INTUITIVENESS | INTERACTIVITY | REUSABILITY | RESPONSE | NATURAL WRITING | COST | PERCEPTION |
|---|---|---|---|---|---|---|---|
| TRADITIONAL BOOKS | YES | NO | LIMITED | NO | YES | LOW | REALITY |
| TABLET PC | YES | LIMITED TO SYNTHETIC TEXT | YES | LIMITED TO VISUAL(DESCRIPTIVE) | YES | HIGH | VIRTUAL |
| LEGACY APPLICATIONS | NO | NO | YES | NO | NO | MEDIUM | VIRTUAL |
| WYWIWYG | YES | 3D GRAPHICS DIGITIZED AUDIO SYNTHETIC TEXT | YES | VISUAL(ILLUSTRATIVE) VISUAL(DESCRIPTIVE) AUDIO(PRONOUNCIATION) | YES | MEDIUM | MIXED REALITY |

TABLE 1. CHARACTERISTICS AND PERFORMANCE OF TEXT RECOGNITION

| DATA SETS | TRAINING SAMPLES | TESTING SAMPLES | ATTRIBUTES | CLASSES | ACCURACY |
|---|---|---|---|---|---|
| DIGITS | 390 | 60 | 1024 | 10 | 95% |
| ALPHABETS | 1560 | 104 | 1024 | 26 | 81% |

INTERACTIVE TRANSCRIPTION SYSTEM AND METHOD

CROSS REFERENCE TO RELATED APPLICATION

The present application claims the benefit of and priority of U.S. Provisional Application No. 61/001,764, filed Nov. 2, 2007, the entire contents of which is hereby incorporated by reference.

FIELD OF THE INVENTION

This invention relates generally to a multi-sensory interactive learning environment and more particularly to a method and system which seamlessly combines natural way of handwriting (real world) with interactive digital media and technologies (virtual world) thus providing a mixed reality perception to the user.

BACKGROUND

Teachers play an important role in the social and cognitive development of children. However, traditional teaching approaches put the focus on teachers and consider students as secondary, as discussed in "New media learning for children—interact with color and tempo", Liu, K. R., Chen, Y. S., Chen, K. T., Chen, H. S., Proc. IEEE International Conference on Sensor Networks, Ubiquitous, and Trustworthy Computing. Volume 2, Taichung, Taiwan (2006) 124-129. This results in lower learning efficiency, since students may become passive and not fully attentive to the material. To improve learning among the diverse group of children, the initiative must come from the learners rather than the teachers. This can be achieved by the use of novel teaching approaches, integrating intuitive design and multimedia technologies. Advances in sensors and media technologies have made it possible to design real-time human-computer interface (HCI) applications suitable for the task. Such applications are receptive to the user's needs, easy to use, and offer multi-sensory experiences.

Although the importance of human tutors cannot be denied in the cognitive and social development of children, it can be enhanced with the use of interactive media technology to enrich the learning process. Emerging interactive media technologies have the potential to not only help young people learn, but also engender a true love of learning, as discussed in "Children and interactive media—a compendium of current research and directions for the future", Wartella, E., O'Keefe, B., Scantlin, R., Markle Foundation, 2000. Smart toys have been designed to stimulate creative and imaginative abilities in children, as discussed in "TSU.MI.KI: Stimulating children's creativity and imagination with interactive blocks", Itoh, Y., et al., Proc. 2nd International Conference on Creating, Connecting and Collaborating through Computing, Kyoto, Japan, 2004, pages 62-70. Researchers have been working on making the learning process for children more intuitive by exploring new paradigms of interaction, as discussed in "Technologies for lifelong kindergarten. Educational Technology Research and Development" Resnick, M., 46(4), 1998. There are also some haptics-enabled learning environments, as discussed in "Haptic desktop for assisted handwriting and drawing", Portillo, O., Avizzano, C., Raspolli, M., Bergamasco, M., Proc. IEEE International Workshop on Robot and Human Interactive Communication, Nashville, Tenn., USA (2005) 512-17, but they require more expensive equipment. In the inventors' previous work the inventors strived to bring the imaginative fantasy world of children in to physical reality by using augmented reality and tangible user interface (TUI) technologies, as discussed in "Magic cubes for social and physical family entertainment", Zhou, Z., Cheok, A. D., Li, Y., Kato, H., CHI Extended Abstracts on Human Factors in Computing Systems, Portland, Oreg., USA (2005) 1156-1157. This encouraged creative thinking and social interaction among children and their families.

Additionally, attempts have been made as disclosed in existing patents claiming to teach and improve student's handwriting skills. These are U.S. Pat. No. 6,215,901, "Pen Based Computer Handwriting Instruction, and U.S. Pat. No. 5,730,602, "Computerized Method and Apparatus for Teaching Handwriting". In U.S. Pat. No. 6,215,901B, for example, a pen based computing system is used to acquire the handwriting sample, and claims to capture writing instrument or implement movement (see patent file page 9, selection 65) over the sensor board, tablet, which is capable of translating the pen stroke information in to electronic signals. The tablet also transmits these signals to connected computer so that it can display the similar stroke on the computer display panel for user to view. Furthermore to properly display the strokes inventor clamps the paper in special position so as to match the orientation on the computer display panel. (see patent page 9, $1^{st}$ column of summary of the invention, first five paragraphs).

Thus, there is a need for a method and a system which addresses the limitations of conventional system and methods and seamlessly combines natural way of handwriting (real world) with interactive digital media technologies (virtual world) for providing a mixed reality perception to the user.

SUMMARY

An aspect of the invention provides an interactive system for providing a mixed or augmented reality experience to a user, the system comprising an object having a transcription surface, the transcription surface for receiving a user's transcription; a tracker having a known position and orientation relative to the transcription surface; an image capturing device to capture an image of the tracker and the transcription surface in a first scene; a microprocessor configured to track the position and orientation of the tracker within the image and to calibrate the tracker with the image capturing device and to track the transcription surface in the first scene by identifying the tracker, the microprocessor configured to identify within the image any transcription made by the user on the transcription surface and retrieve multimedia content associated with the transcription made by the user, the microprocessor configured to generate a second scene having the associated multimedia content superimposed on the first scene in a relative position to the tracker, the microprocessor configured to provide a mixed or augmented reality experience to a user using the second scene.

In an embodiment, the user's transcription may be a drawing, a symbol, a written character of the alphabet, a plurality of written characters of the alphabet and/or representative of a color. The user's transcription may form a word and the transcription may be in different forms such as printing, cursive writing, or the like. The object may be a whiteboard and the user transcribes the transcription with a pen. The system may further comprise a display to display the second scene at the same time the second scene is generated. The system may further comprise a device comprising the processor and display wherein the device is a computer, mobile phone, personal digital assistant (PDA) or a handheld device. The system may further comprise the camera integrated within a single device. The display and camera may be integrated together with the computer in a single device. The tracker may include a gyroscope. The microprocessor may be configured to generate a second scene having the associated multimedia content superimposed on the first scene in a relative position to the user's transcription.

In an embodiment, the tracker may be in a different plane than the transcription surface relative to the image capturing device. The tracker and the transcription surface may be on the same plane relative to the image capturing device. The system may further comprise at least two trackers on the transcription surface, each tracker having known position and orientation relative to the transcription surface. The at least two trackers may be tracked to identify the transcription surface for tracking the position and orientation of the transcription surface, and one of the at least two trackers may continue to be tracked to identify the transcription surface for tracking the position and orientation of the transcription surface when another of the at least two trackers is occluded in the first scene. The system may comprise at least two transcription surfaces, each surface having a tracker having known position and orientation to the transcription surface. The transcription surface may be planar or non-planar.

An aspect of the invention provides a method for providing a mixed or augmented reality experience to a user, the method comprising providing an object having a transcription surface, the transcription surface for receiving a user's transcription; providing a tracker having known position and orientation relative to the transcription surface; capturing a first scene with the transcription surface; calibrating an image capturing device in the first scene comprising an image of the transcription surface and the tracker; tracking the position and orientation of the transcription surface for receiving a user's transcription and the tracker for positioning and orientating the transcription surface in the first scene by identifying the tracker; identifying within the first scene any transcription made by the user on the transcription surface and the tracker for positioning orientating the transcription surface and the transcription; retrieving multimedia content associated with the transcription made by the user; and generating a second scene having the associated multimedia content superimposed on the first scene in a relative position to the marker and the user's transcription to provide a mixed or augmented reality experience to a user using the second scene.

In an embodiment, the method may further comprise displaying the second scene on a display. The method may further comprise tracking at least two trackers on the transcription surface, each tracker having known position and orientation relative to the transcription surface. The method may further comprise tracking the at least two trackers to identify the transcription surface for tracking the position and orientation of the transcription surface. The method may further comprise continuing to track one of the at least two trackers to identify the transcription surface for tracking the position and orientation of the transcription surface when another of the at least two trackers is occluded in the first scene. The method may further comprise providing at least two transcription surfaces, each surface having a tracker having a known orientation to the transcription surface and capturing the at least two surfaces in the first scene.

An aspect of the invention provides a computer program product comprising of a computer-readable medium for carrying computer-executable instructions, which when executed on a computer, cause a system to perform operations comprising capturing a first scene with an image capturing device, the first scene having the tracker and the transcription surface in the first scene image, the transcription surface is on an object and the transcription surface is for receiving a user's transcription, and the tracker has a known position and orientation relative to the transcription surface; calibrating an image capturing device in the first scene comprising an image of the transcription surface and the tracker; tracking the position and orientation of the transcription surface for receiving a user's transcription and the tracker for positioning and orientating the transcription surface in the first scene by identifying the tracker; identifying within the first scene any transcription made by the user on the transcription surface and the tracker for positioning orientating the transcription surface and the transcription; retrieving multimedia content associated with the transcription made by the user; and generating a second scene having the associated multimedia content superimposed on the first scene in a relative position to the marker and the user's transcription to provide a mixed or augmented reality experience to a user using the second scene.

BRIEF DESCRIPTION OF THE DRAWINGS

In order that embodiments of the invention may be fully and more clearly understood by way of non-limitative examples, the following description is taken in conjunction with the accompanying drawings in which like reference numerals designate similar or corresponding elements, regions and portions, and in which:

FIG. 4 illustrates a table of a comparison of an embodiment of the invention with other systems;

FIG. 10A-D are images of real-time online recognition results in accordance with embodiments of the invention.

DETAILED DESCRIPTION

Figure 3:
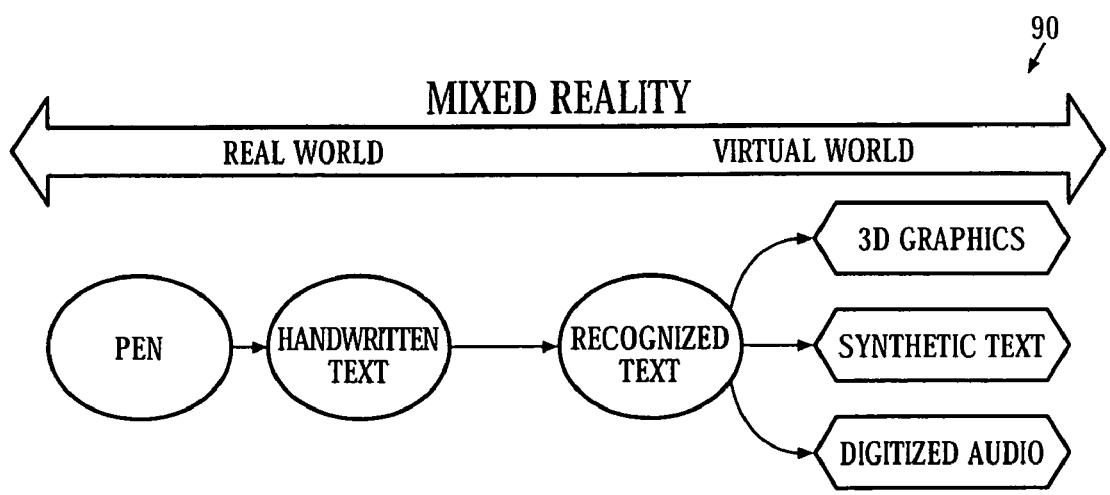
FIG. 3 illustrates a "what you write is what you get" (WYWIWYG) realm over mixed reality domain in accordance with an embodiment of the invention.

Opposed to the conventional inventions discussed above, embodiments of the present invention strive to employ a cheap and more advanced solution to the given problem of handwriting instruction. In the present embodiments of the invention the inventors continue their efforts to develop tools more specifically tailored to children's education. In embodiments of the invention this is taken further by using mixed reality in conjunction with tangible user interfaces (TUI) to make the learning process a fun and exciting experience, as discussed in the inventors' previous work, "Magic cubes for social and physical family entertainment", Zhou, Z., Cheok, A. D., Li, Y., Kato, H., CHI Extended Abstracts on Human Factors in Computing Systems, Portland, Oreg., USA (2005) 1156-1157, a mixed reality system is discussed as mentioned above and the entire contents of which are incorporated herein by reference. In mixed reality the user has complete presence in the real world, while he or she interacts with objects in the virtual world that overlap with the real world. A table 90 showing the mixed reality real world and virtual world components a user experiences is shown in FIG. 3.

Figure 5:
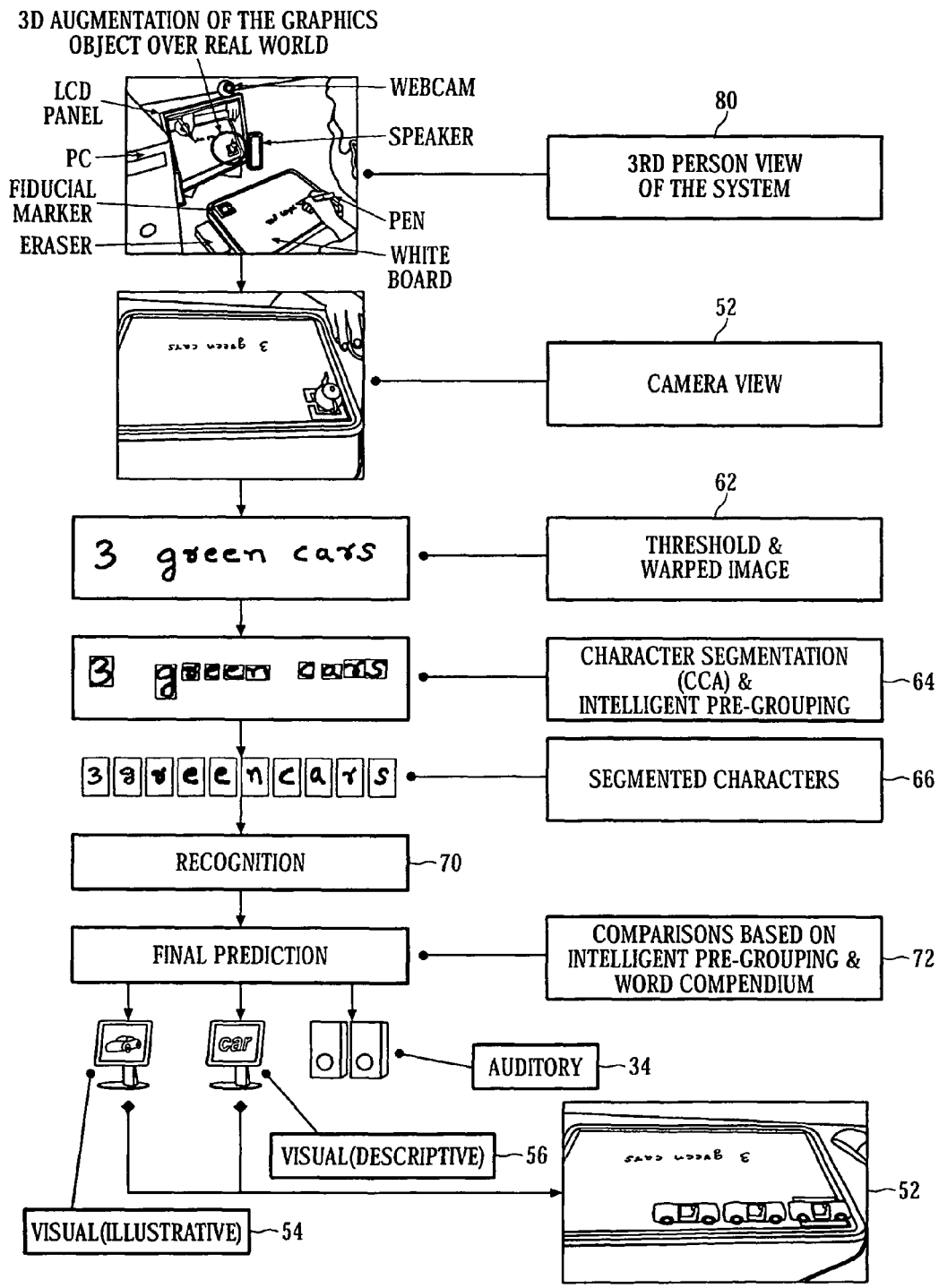
FIG. 5 illustrates a recognition sequence flow chart in accordance with an embodiment of the invention.

In embodiments of the invention, by using everyday, common tangible objects like white board and marker pen and other cheap handwriting scripting equipment may be used in embodiments of the invention. Moreover, an ordinary webcam may be used in embodiments of the invention to capture and communicate the handwriting information supplied by the user to a connected computer system for handwriting analysis. Furthermore connected computer system uses mixed reality scenario to give feedback in terms of audio and visual display. Mixed reality, as stated earlier, is overlapping of the virtual world over the real world. Furthermore the system's visual response is not limited to animated characters or words, but the system may also display corresponding three dimensional (3D) visual illustration of the word. For example if user writes "3 green cars", the system will respond by displaying and overlaying three green car models over user's physical work space along with the textual display of the written characters or words, as shown in the flow chart figure of FIG. 5 and the third person view 80 of the system of an embodiment of the invention in FIG. 2, on the connected display panel. Furthermore, in an embodiment the system may respond by dynamically synthesizing the recognized text to speech for teaching the proper pronunciation of the written word. In FIG. 5, the third person view of the system 80 and the camera view of the second scene image 52 is shown. The threshold and warped image 62 in this embodiment is shown as hand written "3 green cars", and the following character segmentation (CCA) and intelligent pre-grouping 64 is shown, with segmented characters 66 followed by recognition 70. Comparisons based on intelligent pre-grouping and word compendium for example is shown 72 with visual (illustrative) 54, visual (descriptive) 56, and the like of secondary scene image 52 on display with any other output such as auditory 34 or the like.

A discussion of the various aims and goals which embodiments of the present invention are intended to achieve is provided. Considerable portion of the children's daily activities is comprised of playing different games. The varying dynamics of the game play keeps them indulged in the activity for hours. In contrast, practicing the writing skills in traditional way of character template tracking seems less exciting and more routine. To overcome these shortcomings of traditional approaches, embodiments of the invention provide a system that augments the learning time with play time. More specifically the proposed design of an embodiment of the invention provides improved teaching scenarios in which children feel enthusiastic and take initiative towards learning. To achieve this stated goal it is necessary for novel teaching approaches, integrating intuitive design and multimedia technologies. An embodiment of the invention is a novel, media-rich (text, graphics, video & audio) system which brings the virtual world to children's perceptive reality by merely interpreting handwritten words. In this embodiment of the system, users are encouraged to hand write the words, for the system to respond. In an embodiment, the user can write the name of a physical object to see corresponding computer generated model in mixed reality. The user such as a child can then color these models with different handwritten commands. In an embodiment, the directive is given in the form of handwritten color name. The user can also create multiple copies of the model by writing numerical identities. A term for this interface is "What you write is what you get" (WYWIWYG), as a counterpart to the inventors' previous work, "What you say is what you get" (WYSIWYG) as discussed in, "Multi-sensory musical entertainment systems", Zhou, Z., Cheok, A., Liu, W., Chen, X., Farbiz, F., Yang, X., Haller, M., IEEE Transactions on Multimedia 11 (3), 2004, 88-101, which is incorporated herein by reference.

Figure 6:
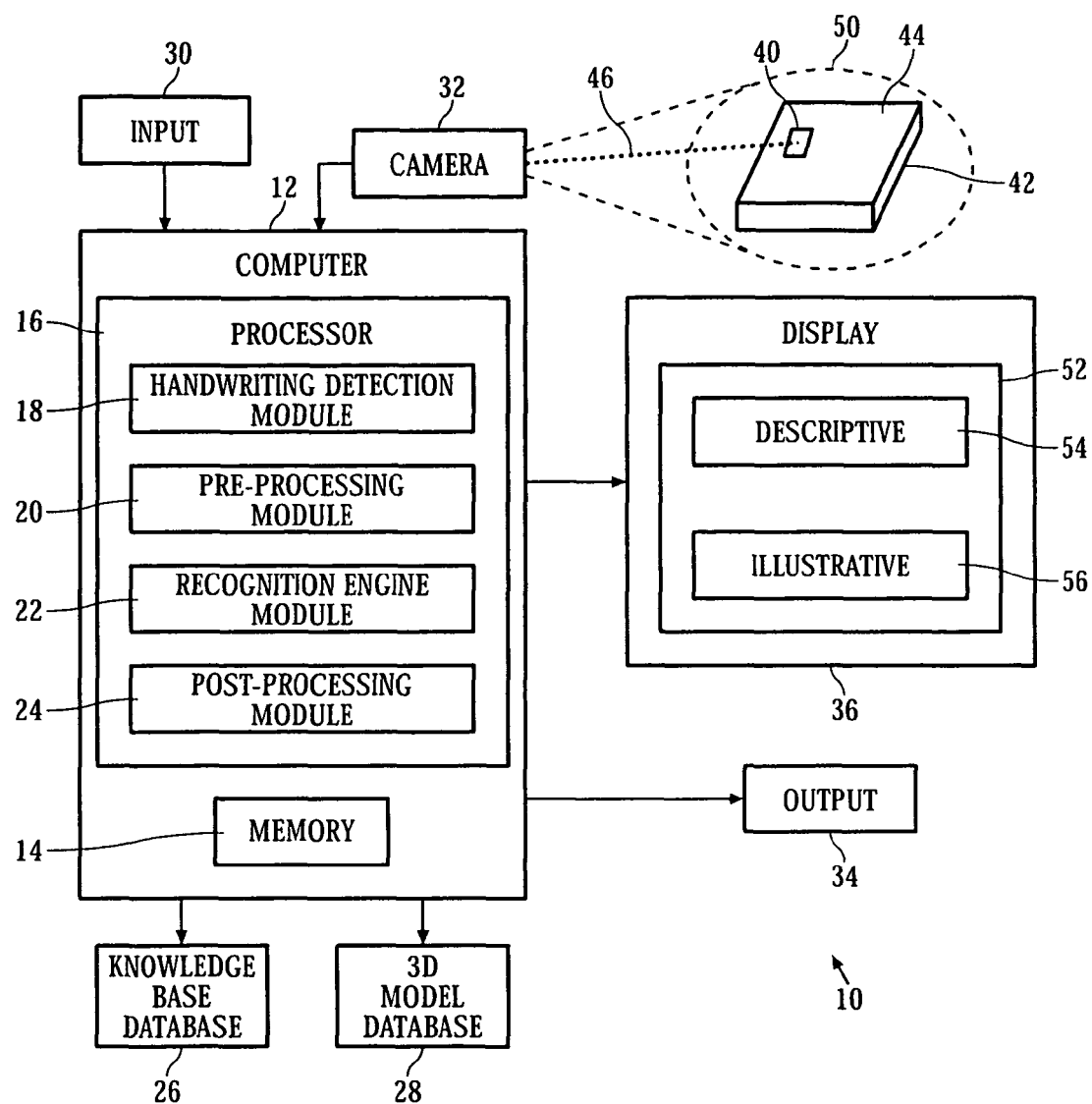
FIG. 6 shows a system block diagram in accordance with an embodiment of the invention.

FIG. 6 shows a system block diagram in accordance with an embodiment of the invention. The system 10 comprises a processor 16 within a computer 12. The processor 16 is interconnected to memory 14, databases 26,28 and input 30,32 and output devices 34,36. Input devices 30,32 may comprise keyboard, writing tablet, touch screen, microphone, camera and the like. Output devices may comprise of speakers, headphones, display, and the like. The processor 16 comprises a number of modules such as handwriting detection module 18, pre-processing module 20, recognition module 22, post-processing module 24 and the like. The databases may include knowledge base database 26, 3D model database 28 and/or the like. It will be appreciated that the databases may reside within the computer or may be remote to the computer 12. The databases 26,28, input and output devices may be resident on or within the computer device 12 or remote to the computer device 12. The databases and input and output devices may be interconnected with the processor 16 and memory via wire or wireless applications and via networks such as local such as local area network (LAN) or public networks such as the Internet.

The camera 32 takes an image of an image area 50 shown by dashed oval to capture a first image or scene. The object 42 within the image area 50 has a transcription surface 44 with a marker or tracker 40. The calibration of the camera with respect to the tracker is performed as shown by dashed line 46. The image area may take any configuration other than oval such as square, rectangular, etc. and may not necessarily include the entire surface of the transcription surface the object 42. The display 36 shows a second image or scene 52 that includes the first image or scene 50 with descriptive 54 and illustrative 56 model elements superimposed over the first scene.

The tracker or marker 40 is shown as a fiducial marker. Such a marker and calibration process is described in the inventors' previous works such as US patent application publication nos. 2005/0276444, 2005/0288078, and 2005/0264555 the entire contents of each are all incorporated herein by reference. The tracker 40 may also incorporate other positioning systems such as global positioning system (GPS) tracking system, gyroscope based systems, infrared tracking systems, and the like to measure and maintain orientation and position between the tracker and the camera.

In an embodiment the transcription surface may be any surface of an object capable of capturing a user's transcription. For example, a transcription surface may be any writing surface that may be marked or surface that can sense that allows a user to input a transcription. For example, a touch screen, stylus screen, may sense the input to display the transcription. In such an embodiment the image capture device captures the display of the transcription on the screen. Of course other means of marking a transcription that may be captured by an image capture device may be implemented, such as for example, by a marker, such as a white writing board and marker ink pens, black board and chalk, paper and pen, paper and brushes with water, paint or the like.

Figure 2:
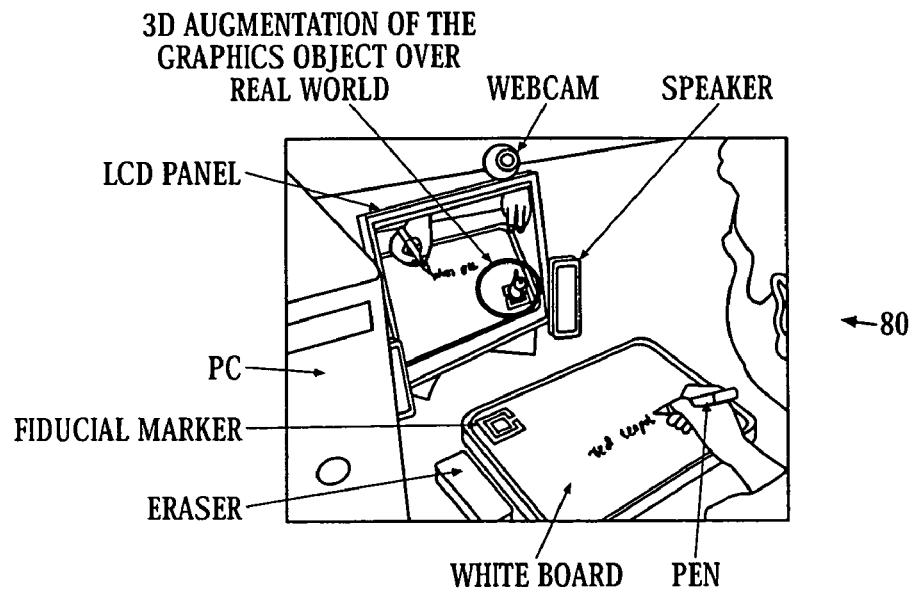
FIG. 2 illustrates a system usability setup in accordance with an embodiment of the invention.

In an embodiment the system may be responsive to basic three categories (noun, color and digit) and may be extended by incrementing the database with more categories such as for example, actions. In addition to visual response users such as children may also receive auditory response from the system, thus teaching the user pronunciation of the word, digit and color they have written. An embodiment of the invention is referred to as "What you write is what you get" (WYWIWYG) which aims at improving the way users such as children learn. Accepting simple handwritten directives by children, the system may be configured to respond with multimodal (visual and auditory) feedback in mixed reality space. In an embodiment regarding auditory feedback, proper pronunciation of the written words is synthesized in to digital format. It is then outsourced to the user through connected speaker. In an embodiment of the invention, there are two different visual feedbacks that the system can offer, namely illustrative and descriptive. For illustrative feedback system overlay's 3D animated graphics over user's physical work space. For descriptive feedback, computer generated text corresponding to recognized words is displayed in virtual space augmenting the real world work space. FIG. 3 shows WYWIWYG realm 90 over real and virtual horizons. The system takes the physical handwriting written on the transcription surface and registers multimedia responses with user's physical work space, thus providing mixed reality perception. WYWIWYG offers pen based interaction in mixed reality environment. By using every day tangible objects like a maker pen and a white board, the system offers an intuitive interface that provides a multi-sensory response. A user handwrites the words by using the pen. These words are interpreted by the system as a written directive by the user. The system may accordingly responds by auditory (digitized pronunciation of the word written) and visual feedback (3D animated graphics and recognized text in digital format). The user can then move the writing board to view the 3D graphics object from different angular perspectives. The user can also interact with the object by handwriting different color names, to change the color of an object. The user can also clone the object by writing digits on the board. FIG. 2 shows an embodiment of the actual system setup and practical interaction scenario from a third person view 80 of the system.

With this motivation, a media-rich (text, graphics, video) system and application is provided which combines the flexibility of the virtual world with a handwriting recognition engine 18 to create a tangible mixed reality learning environment. In an embodiment, WYWIWYG aims on improving the writing skills of children by focusing on handwriting improvements, noun-to-3D physical representation of the object and proper pronunciation of the words and digit. Unlike other conventional handwriting applications, where aim is to achieve higher recognition rate by avoiding cursive writing, our approach encourages users such as children to write properly for the system to interpret and translate the writings to multimedia responses. An embodiment of the WYWIWYG system has been compared against traditional medium like books (writing, coloring and word books), tablet PC, legacy applications (like Microsoft's Paint) as shown in the table 100 of FIG. 4. FIG. 4 gives the breakdown of the comparisons in multicolumn chart format. WYWIWYG offers highly intuitive interface using affordance of marker pen and common writing board. In contrast legacy applications on desktop PCs, like Microsoft Paint, use input peripherals (for example keyboard or mouse and the like) to interact with the writing/drawing canvas. The WYWIWYG system also offers dynamic interactivity with multimedia contents (for example like changing colors, cloning objects and 3D view of the graphical contents and the like) in contrast to other mediums. In case of tablet, the PC only recognizes the text that is displayed. While in case of books and legacy applications, interactions are performed in terms of passively writing or drawing on the canvas. WYWIWYG gives superior feedback and high reusability.

In traditional approaches for practicing handwriting, students are often asked to trace the character templates in the book. Once they track these templates there is no automatic feedback, positive or negative, to the writing. In contrast WYWIWYG gives an auditory response and a textual feedback. Also character templates can only be used for limited number of times (corresponding to how many copies of single character are in the book to trace and how many time it can be re-traced after erasing last trace). In contrast WYWIWYG offers high re-usability. By using white board and marker pen children can write words as many times as they like without the need of replacing the board. By giving 3D graphics and animation response, coupled with digital audio, preliminary user studies of an embodiment of the invention have shown significant potential of the system to aggrandize concentration and incitement towards learning to write properly. In an embodiment of the invention, users such as children may use normal writing surfaces such as a white writing board and marker pens, black board and chalk, paper and pen, and the like to write the name of an object. The physical object then appears as a 3D model in a virtual world. The virtual world is augmented with a real world scene to give a consistent mixed reality perception. Now users, such as children, can play with the virtual object, existing in perceived reality, by coloring it with different colors and making multiple copies of the object using handwritten commands. Embodiments of the invention offer cost-effective solution and can be deployed on a desktop PC or a notebook without the need for special equipment.

Possible industrial applications include next generation teaching systems, extended versions of WYWIWYG can serve as multiplayer gaming platforms, and the like. Other applications may also include a communication aid and interface for a disabled user, search and retrieve interface for accessing information on the screen by writing the desired information within a database or network such as the internet, a command interface for controlling systems and methods by writing the desired command for the system or method, an idea generation interface for designers to sketch and share 2D/3D information, or the like.

Since WYWIWYG is a classifier based system, the response of the system depends on the handwriting of the user. In one embodiment the classifier has been "trained" with handwriting samples from different writers. Of course it will be appreciated that the classifier may be trained with commercially available handwriting sample database which in turn will give better results in terms of recognition.

FIG. 4 is a table that compares and embodiment of the invention with conventional systems and methods such as traditional writing books, Tablet PC Platform, Legacy applications (like MICROSOFT PAINT), and the like. MICROSOFT PAINT is a trademark of Microsoft Corporation of Redmond, Wash., United States of America.

Figure 1:
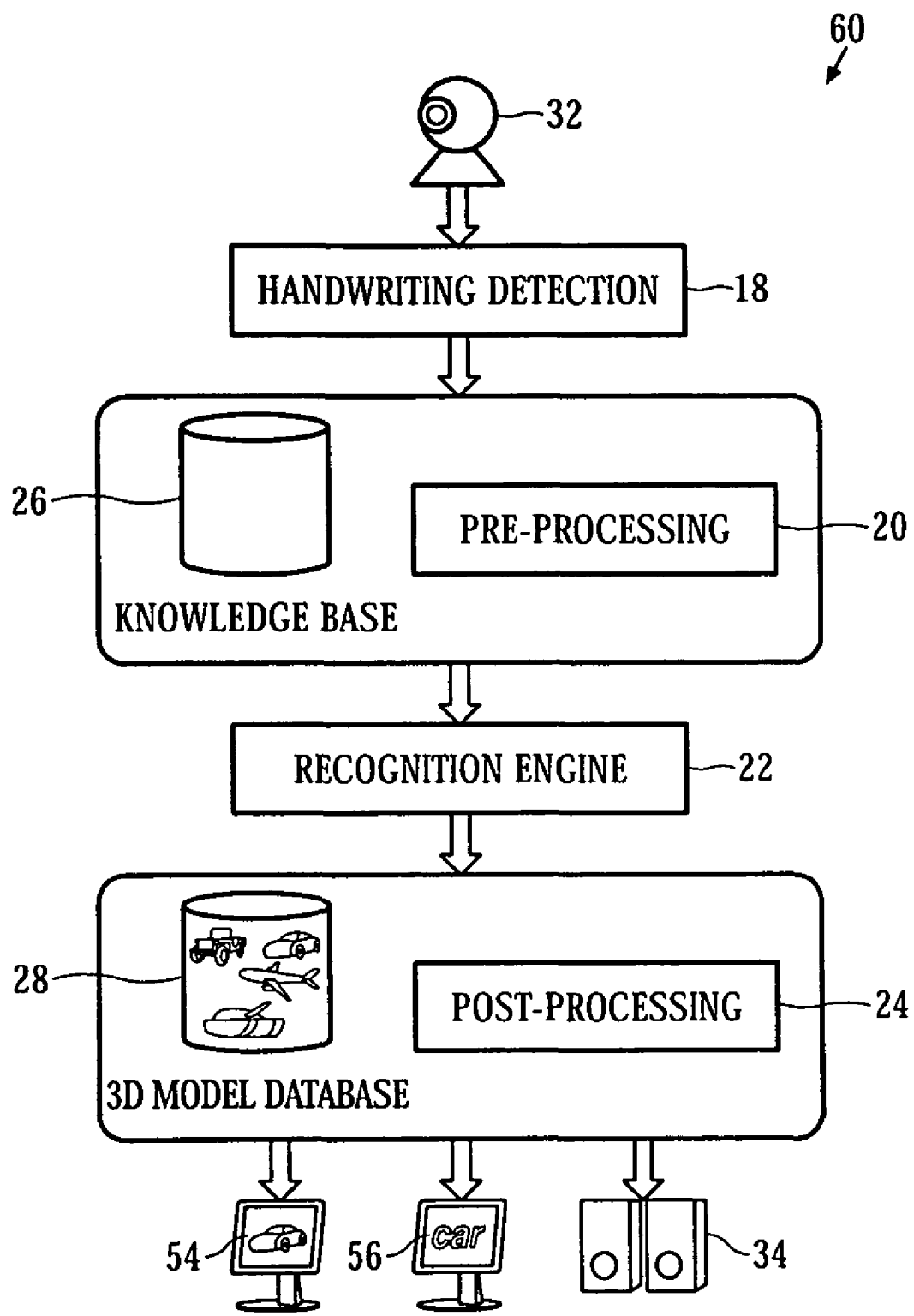
FIG. 1 illustrates a system level sequence diagram in the abstract level in accordance with an embodiment of the invention.

FIG. 1 shows the system hardware setup of an embodiment of the invention and comprises of a white board, a fiducial marker, a black marker pen, a webcam and a PC. The white board is used here for the reusability of the writing area. A tracker or fiducial marker 40,41 is used to accurately position the 3D virtual object in mixed reality space, and to locate the writing area relative to its position. FIG. 1 shows the system diagram 60. A digital image of the writing area is captured by a webcam 32. This image is first warped and then analyzed for the presence of text (by identifying hand occlusion). Once the text is detected 18, the image is forwarded to a pre-processing stage 20 with reference to knowledge base 26. A character matrix is generated by the pre-processing stage 20 for each character detected in the image. This character matrix is then analyzed by the recognition engine 22, which generates a prediction matrix. The final recognition in terms of noun, color and digit is obtained by cross-referencing the output 54,56,34 with the knowledge base 26 in post processing stage 28 and 3D model database 28.

Multiple Tracker Tracking/Multiple Transcription Surfaces

In embodiments, more than one tracker 40,41 may be provided to aid in the occurrence that one of the trackers is covered up by the user for example with the user's hand. In this instance the system continues to track the tracker and the transcription surface that is not covered up and that is still visible in the first scene captured by the image capture device. Similarly, in embodiments there may be more than one transcription surface 44,45. In embodiments, one tracker may have a known relationship 48,49 such as position or orientation with each transcription surface, or the system may be configured with a tracker, or at least one tracker, for each transcription surface. FIG. 8A-D show the known position and orientation 48,49 of the transcription surface relative to the tracker configured with a single tracker, multiple trackers, single transcription surface, or multiple transcription surfaces on the same or different planes in accordance with embodiments of the invention. It would be apparent to have different embodiments with different configurations of trackers and transcription surfaces, the position and orientation of which would be tracked in real time within the system.

Text Warping:

In an embodiment, the first step is capturing image frames of 640×480 resolutions with a webcam. The captured image is in 24-bit, 3-channel red, green and blue (RGB) format. It is converted to binary image, using dynamic threshold [9], for subsequent processing. Since the writing area is not clearly visible in the acquired image (perspective view from camera), a perspective warp is applied to the image to get the orthogonal view of the writing area. This is done by locating the writing area corners (four points) relative to fiducial marker and warping the image area, bounded by a rectangle, comprised of these four corners. It will be appreciated that this may be achieved with less or more points than four points as discussed in this embodiment. For example at least three points may be used to define the transcription surface or plane of the transcription surface. Additionally, in other embodiments more than one tracker Text Detection Trigger:

Text detection is triggered using simple hand occlusion mechanism. Since hand color is considerably different then the white board and in threshold image its darker than back ground. The standard deviation of the writing area is then computed. If the standard deviation is large enough (greater than defined threshold) we trigger the recognition sequence, as shown in FIG. 5, otherwise tracking continues for the hand occlusion.

Pre-Processing:

Once the text detection is triggered image undergoes a series of pre-processing steps before input to the recognition engine. The image is forwarded to character-level segmentation. This segmentation is done by Connected Component Analysis (CCA) as discussed in "A threshold selection method from grey-level histograms", Otsu, N., IEEE Transactions on Systems, Man and Cybernetics 9(1), 1979, 62-66, which is incorporated herein by reference, followed by the intelligent Pre-Grouping of characters. Characters may be grouped under the alphabet and digit categories, by measuring the distance between the centers of gravity of adjacent character areas. This Pre-Grouping of characters along with the word compendium (word database corresponding to number of different models that system can load and display) builds up the knowledge base, which is used in the post-processing stage to get the final recognition results in terms of digit, color and noun. Part of knowledge base (Pre-Grouping) is updated each time a new word or digit is written by the user. The word compendium part of knowledge base remains static, unless updated in offline mode (by incrementing the word database and adding corresponding 3D model for display).

Once the characters are extracted, they are normalized to 32×32 pixels using bilinear interpolation. Normalized characters are then formatted (saved in text file) for processing by the recognition engine. Since we already have the Pre-Grouping of character (identification of the possible digit and alphabets) we save alphabets and digits in separate files The mode of saving is writing all the 1024 pixels (32 rows×32 columns) of character in linear sequence as follows

| | Category | Index | Pixel value | ... | Index | Pixel Value |
|---|---|---|---|---|---|---|
| Character 1 | 1 | 1 | A | ... | 1024 | A |
| Character . | . | . | . | . | . | . |
| Character . | . | . | . | . | . | . |
| Character . | . | . | . | . | . | . |
| Character X | 1 | 1 | A | ... | 1024 | A |

First column is to explain the format and is not part of the saved text file. It shows how each character image is saved in row by row fashion. "X" is total number of characters in any given file Where category is by default set to 1 for all segmented characters images. This is supplied dummy category to recognition engine (see recognition). A is the pixel value either 0 or 1 (since it's a binary image).

Figure 9:
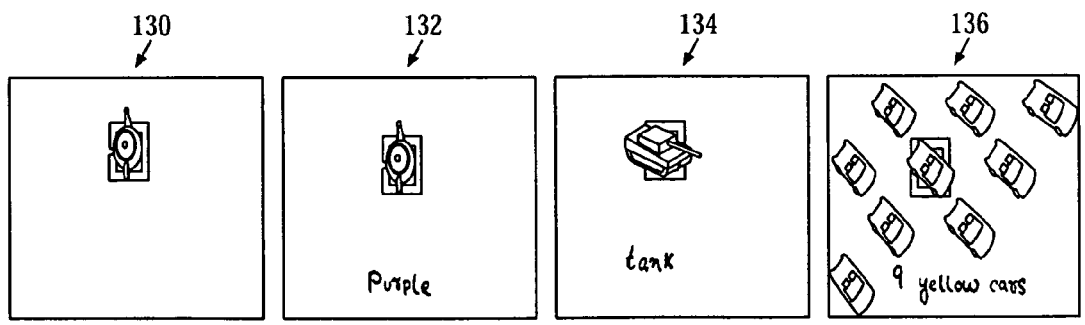
FIG. 9 is a table showing the characteristics and performance of text recognition in an embodiment of the invention.

Recognition:

A C-SVC type vector machine, may be used in an embodiment of the invention for example as disclosed in "LIBSVM: a library for support vector machines" Chang, C., Lin, C. (2001), which is incorporated herein by reference. In an embodiment, the C-SVC type vector machine is with RBF kernel support as a recognition engine. The performance of the SVM model depends on the fine tuning of its parameters C (error cost) and γ (kernel parameter). These parameters are selected with the help of γ-fold cross-validation technique, where v denotes the number of subsets the training data is divided into. First, a coarse grid search is performed with parameters C and γ having wide range of values, with exponential steps ($2^{-5}$, $2^{-4}$, ... $2^4$, $2^5$). The parameter values are selected with the highest cross-validation rate and perform a finer grid search in the neighborhood of these values. This ensures the best possible recognition rates in online (recognition) mode. Once the best parameters are found the recognition engine is trained with the complete training data set. The recognition engine may be trained for digits and alphabets separately. For example, FIG. 9 shows a table 110 of characteristics and performance of text recognition rates for both alphabets and digits. In an embodiment two trained model files for the recognition engine to load may be trained when in online mode (recognition mode). Recognition engine (SVM) loads the saved character image files and stores the corresponding classification either on disk in file or in array in program.

Post-Processing:

The output of the recognition engine is a 1×N prediction matrix, corresponding to each character detected in the input text. To achieve good recognition results at the word level, we cross-reference the prediction matrix with the knowledge base. First the prediction matrix is divided into digit and alphabet groups, using the Pre-Grouping from before. Then the alphabets are further classified into colors and nouns by comparing them with the available word compendium. This results in the final recognition in terms of number, color and noun.

Once the final recognition is done corresponding system responses are invoked. In case of auditory response system translates the recognized text to digitized audio and plays the audio through connected speakers. There are two kinds of visual responses, illustrative and descriptive. For descriptive feedback, computer generated text corresponding to recognized words is displayed in virtual space augmenting the real world work space.

For illustrative response system overlay's 3D animated graphics model over user's physical work space (the writing board). If only the color is present, the color of the default model (a tea-pot) is changed. If only the noun is present, the corresponding 3D model is loaded in default color (white). Digit recognition clones the virtual model according to the number recognized. The 3D models are in wavefront geometry definition format as discussed in "On visual similarity based 3D model retrieval", Chen, D. Y., Ouhyoung, M., Tian, X. P., Shen, Y. T., Ouhyoung, M., Proc. Eurographics, Granada, Spain, 2003, 223-232, which is incorporated herein by reference, and are rendered using MXR Toolkit as discussed in a website having a hypertext transfer protocol (http://) of mxrtoolkit.sourceforge.net, which is the inventors' open source mixed-reality application programming interface (API).

In an embodiment of the invention, an objective of the mixed reality environment may be to serve as an interactive learning tool, and input in terms of handwritten characters is encouraged, thus facilitating the goal of learning while playing. In an embodiment, the system displays multiple instances of a plurality of models corresponding to a plurality of nouns in the word compendium and also a plurality of colors. Recognition and display are done in real-time, which is necessary for the user to have a consistent mixed reality perception. Real-time online recognition results 130, 132, 134, 136 of an embodiment is shown in FIG. 10A-D. The tracker 40 is shown in the display scene 130 shows default model of a teapot, and the transcription is shown in display scene 132 with real-time change of color of multimedia content or change in a default parameter, i.e. the teapot changes color to purple after the transcription "purple" is written by a user on the transcription surface shown in FIG. 10B. The multimedia content changes or the model changes on the display screen 134 to tank after the transcription "tank" is hand written by a user on the transcription surface shown in FIG. 1C. In FIG. 10D the media content changes or number and model changes to nine yellow cars on the display scene 136 after "9 yellow cars" is hand written by a user on the transcription surface. The processing speed of the system for example may be 10 frames per second. The average recognition time in an embodiment of the system is 400 msec on a current Pentium D. The system may be developed in C++, using MXR Toolkit and OpenCV, as discussed in Open Computer Vision Library (Open CV) in a website having a hypertext transfer protocol (http://) of www.opencvlibrary.sourceforge.net.

In other modes of practice of embodiments of the invention, it will be appreciated that more categories may be added to the WYWIWYG system. In an embodiment, three categories may include namely noun, color and digit. Other categories may be added including "action" (such as 3 green cars "running"). Furthermore it can be extended to multiuser interaction. In an embodiment the system supports single user interface. In another embodiment a multi-user scenario system may be used as a gaming platform where each contender has power to design their own contents by merely handwriting.

It will be appreciated that the transcription may be by writing with a pen on the transcription surface or plane such as a marker board as described above, however, any mode of transcription may be implemented in embodiments of the invention. For example instead of a writing implement such as a pen, transcription may be performed by any device that marks the surface of the transcription surface. Such transcriptions devices may include markers, stamps, or the like. Likewise, transcription surfaces may be configured to have different shapes as long as the shape is known. The transcription surface may be planar, curved and the like. The material of the surface may be different materials that are capable of capturing a transcription such as a white marker board, black board, paper, and the like, and the material of the transcription device is a material that is compatable and/or response to the material of the transcription surface that allows the image capturing device to capture the transcription, i.e. any surface that is transcriptable. The act of transcribing may be by writing, stamping, marking and the like a transcription for example a symbol, character, letters, words, numbers or the like onto the surface of the transcription surface which is recognized by the recognition module of the system to access and display the desired multi-media content that is associated with the trantscription.

In the embodiment discussed above the system is a personal computer with a stand alone image capturing device, a stand alone display, and stand alone transcription surface, however, it will be appreciated that any combination of the system components may be configured as stand alone and/or integrated in a single device. Additionally, the system components may be located remotely from each other and even connected via a network such as a local area network (LAN) or a public network such as the Internet. The system components may be connected to each other in a wired or wireless means. In embodiments of the invention the image capturing device is arranged to be in sight of the transcription surface. The processing computer system, the display and the stand alone image capturing device may be in a single integrated device such as a mobile phone, personal digital assistant (PDA), handheld devices and the like. In embodiments, the display may be formed integral to the processing computer device and the image capture device and the transcription surface may be remote to the display and computer device. The image capture device and the transcription surface are calibrated and the image capture device is configured to capture an image of the transcription on the transcription surface. The image capture device is calibrated relative the tracker and the transcription surface within an image area of the first scene and the transcription is also within the image area of the first scene.

Figure 7A:
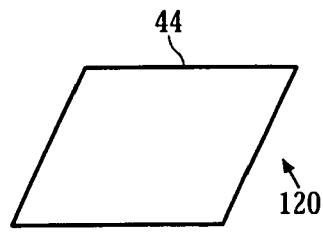
FIG. 7A-B show different configurations of transcription surfaces in accordance with embodiments of the invention.
Figure 7B:
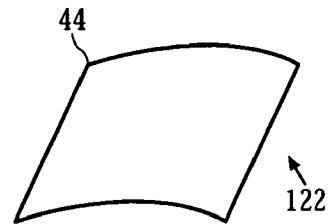
Figure 8A:
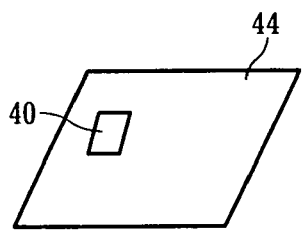
FIG. 8A-D show the known position and orientation of the transcription surface relative to the tracker configured with a single tracker, multiple trackers, single transcription surface, or multiple transcription surfaces on the same or different planes in accordance with embodiments of the invention.
Figure 8B:
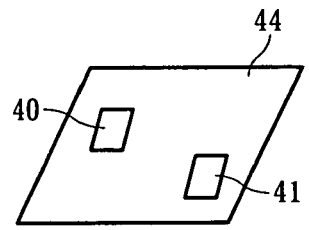
Figure 8C:
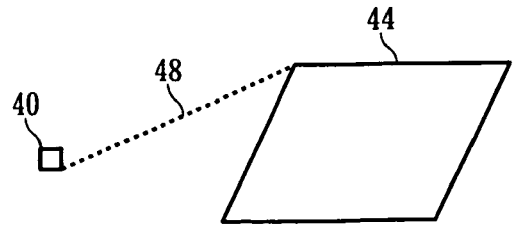
Figure 8D:
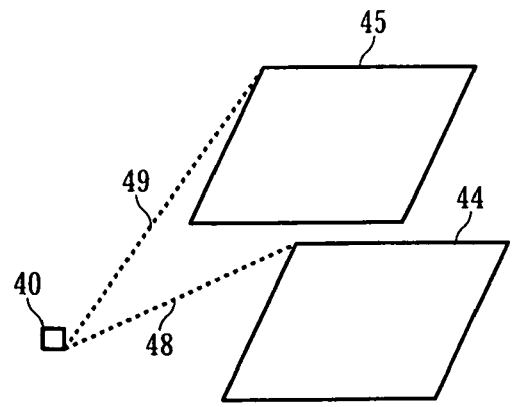

In an embodiment the transcription surface and the tracker may be located on different planes relative to the image capture device, as shown in FIG. 8A-D. The calibration of the image capture device 32 and the transaction surface 44 may be made with respect to the tracker 40, and as long as the relative orientation 48 and other parameters such as distance, shape, and like are known to determine the position of the transcription surface relative the tracker. The transcription surface 44 may be different configurations such as planar 120 as shown in FIG. 7A, non-planar 122 as shown in FIG. 7B, or the like. Once the tracker 40 is calibrated with the image capture device, the image capture is also calibrated with the image capture device as long as the components are known to determine the orientation and position of the transcription surface relative to the tracker. If the position of the transcription surface is known, then the position of the transcription surface relative to the image capture device is known once the image capture device is calibrated with the tracker.

While embodiments of the invention have been described and illustrated, it will be understood by those skilled in the technology concerned that many variations or modifications in details of design or construction may be made without departing from the present invention.

The invention claimed is:

1. An interactive system for providing a mixed or augmented reality experience to a user, the system comprising:
   an object having a transcription surface, the transcription surface for receiving a user's transcription;
   a tracker having a known position and orientation relative to the transcription surface;
   an image capturing device to capture a 2-dimensional digital image of the tracker and the transcription surface;
   the tracker having a positioning system for measuring and maintaining orientation and position with the image capturing device;
   a microprocessor configured to track the position and orientation of the tracker within the image and to calibrate the tracker with the image capturing device and to track the transcription surface by identifying the tracker, the microprocessor configured to identify within the image any transcription made by the user on the transcription surface and retrieve 3-dimensional visual illustration associated with the transcription made by the user, the microprocessor configured to display on a screen the associated 3-dimensional visual illustration superimposed on the image in a relative position to the tracker.

2. The system of claim 1 wherein the user's transcription is a drawing.

3. The system of claim 1 wherein the user's transcription is a symbol.

4. The system of claim 1 wherein the user's transcription is representative of a color.

5. The system of claim 1 wherein the user's transcription is a written character of the alphabet.

6. The system of claim 1 wherein the user's transcription is a plurality of written characters of the alphabet.

7. The system of claim 6 wherein the user's transcription forms a word.

8. The system of claim 6 wherein the user's transcription is cursive writing.

9. The system of claim 1 wherein the object is a whiteboard and the user transcribes the transcription with a pen.

10. The system of claim 1 wherein the screen displays the associated 3-dimensional visual illustration superimposed on the image in a relative position to the tracker.

11. The system of claim 10 wherein the microprocessor, image capturing device and screen are part of a single integral device and the device is one of a computer, a mobile phone, a personal digital assistant and a handheld device.

12. The system of claim 1 wherein the image capturing device is a camera.

13. The system of claim 1 wherein the tracker includes a gyroscope.

14. The system of claim 1 wherein the tracker is in a different plane than the transcription surface relative to the image capturing device.

15. The system of claim 1 wherein the tracker and the transcription surface are on the same plane relative to the image capturing device.

16. The system of claim 1 wherein the system comprises at least two trackers on the transcription surface, each tracker having known position and orientation relative to the transcription surface.

17. The system of claim 16 wherein the at least two trackers are tracked to identify the transcription surface for tracking the position and orientation of the transcription surface.

18. The system of claim 16 wherein the one of the at least two trackers continues to be tracked to identify the transcription surface for tracking the position and orientation of the transcription surface when another of the at least two trackers is occluded in the image.

19. The system of claim 1 wherein the system comprises at least two transcription surfaces, each surface having a tracker having known position and orientation to the transcription surface.

20. The system of claim 1 wherein the transcription surface is planar.

21. The system of claim 1 wherein the transcription surface is non-planar.

22. A method for providing a mixed or augmented reality experience to a user, the method comprising:
   providing an object having a transcription surface, the transcription surface for receiving a user's transcription;
   providing a tracker having known position and orientation relative to the transcription surface, the tracker having a positioning system for measuring and maintaining orientation and position with the image capturing device;
   capturing a 2 dimensional digital image having the tracker and the transcription surface;
   tracking the position and orientation of the transcription surface by identifying the tracker in the image;
   identifying within the image any transcription made by the user on the transcription surface;
   retrieving a 3-dimensional visual illustration associated with the transcription made by the user; and
   displaying on a screen the 3-dimensional visual illustration superimposed on the image in a relative position to the tracker.

23. The method of claim 22 further comprising tracking at least two trackers on the transcription surface, each tracker having known position and orientation relative to the transcription surface.

24. The method of claim 23 further comprising tracking the at least two trackers to identify the transcription surface for tracking the position and orientation of the transcription surface.

25. The method of claim 23 further comprising continuing to track one of the at least two trackers to identify the transcription surface for tracking the position and orientation of the transcription surface when another of the at least two trackers is occluded in the first scene.

26. The method of claim 22 further comprising providing at least two transcription surfaces, each surface having a tracker having a known orientation to the transcription surface and capturing the at least two surfaces in the image.

27. A computer program product comprised of a computer-readable medium for carrying computer-executable instructions, which when executed on a computer, cause a system to perform operations comprising:

capturing a 2 dimensional digital image with an image capturing device, the image having a tracker and a transcription surface in the first scene, the transcription surface is on an object and the transcription surface is for receiving a user's transcription, and the tracker has a known position and orientation relative to the transcription surface and the tracker has a positioning system for measuring and maintaining orientation and position with the image capturing device;

tracking the position and orientation of the transcription surface in the image by identifying the tracker;

identifying within the image any transcription made by the user on the transcription surface;

retrieving a 3-dimensional visual illustration associated with the transcription made by the user; and displaying on the screen the associated 3 dimensional visual illustration superimposed on the image in a relative position to the tracker.

\* \* \* \* \*